Figure 1:
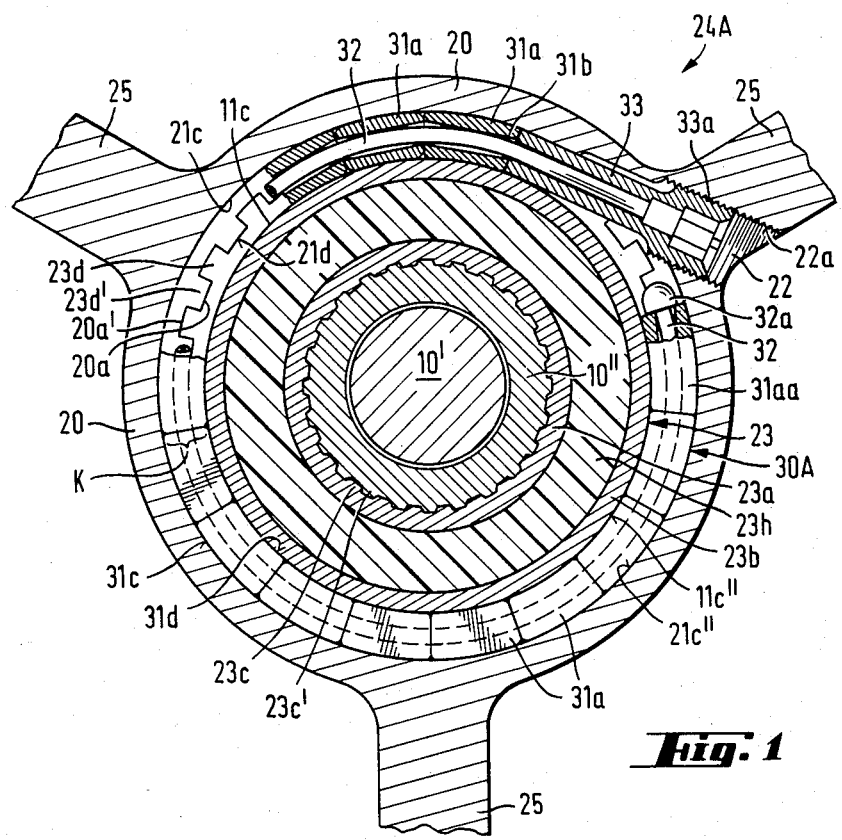

United States Patent [19]

Pichl

[11] Patent Number: 4,498,874

[45] Date of Patent: Feb. 12, 1985

[54] BLOCKING DEVICE FOR PREVENTING AXIAL MOVEMENT IN SELECTED EXTENT

[75] Inventor: Heinz Pichl, Upsala, Sweden

[73] Assignee: Volvo Penta AB, Gothenburg, Sweden

[21] Appl. No.: 379,348

[22] Filed: May 18, 1982

[30] Foreign Application Priority Data

May 21, 1981 [SE] Sweden ............................. 8103203

[51] Int. Cl.³ .............................................. B63H 23/34
[52] U.S. Cl. ........................................ 440/83; 285/305
[58] Field of Search ............... 440/83, 81, 88, 89; 403/355, 319, 344; 285/305, 421, 403, DIG. 19

[56] References Cited

U.S. PATENT DOCUMENTS

| 2,064,195 | 12/1936 | Michelis | 440/81 |
| 2,403,368 | 7/1946 | Howard | 285/305 |
| 3,142,498 | 7/1964 | Press | 285/305 |
| 3,239,244 | 3/1966 | Leinfelt | 285/305 |
| 3,606,402 | 9/1971 | Medney | 285/305 |
| 3,952,686 | 4/1976 | Pichl | 440/89 |
| 4,052,091 | 10/1977 | Bowden | 285/403 |
| 4,293,148 | 10/1981 | Milberger | 285/305 |

FOREIGN PATENT DOCUMENTS 1310712 10/1962 France ............................. 285/305

Primary Examiner—Trygve M. Blix
Assistant Examiner—Jesùs D. Sotelo
Attorney, Agent, or Firm—Arthur G. Yeager

[57] ABSTRACT

A boat propeller device including an inner hub wall defining an opening for a shaft and having an outer circumferential groove, a partly flexible, elongated and unitary plastic locking member partially located in the outer groove. The shaft has an inner circumferential groove in its surface for partially receiving the locking member therein. An access port enables introduction of the locking member into an inner channel defined by the inner and outer grooves in juxtaposed position. The locking member includes spaced indentations for increasing the flexibility thereof; the oppositely disposed indentations forming reduced cross-sections thereof and defining flexible bridges, and between each two adjacent indentations rigid link members are formed and are of a trapezoid-shape cross-section. One of the terminal link members is releasably affixed to the hub and spline connection blocks rotational movement between the hub and shaft. The propeller may be mounted for push or traction on the hub and is axially moveable to a limited extent to unblock an auxiliary exhaust port when the propeller is in position for rearward drive.

21 Claims, 17 Drawing Figures

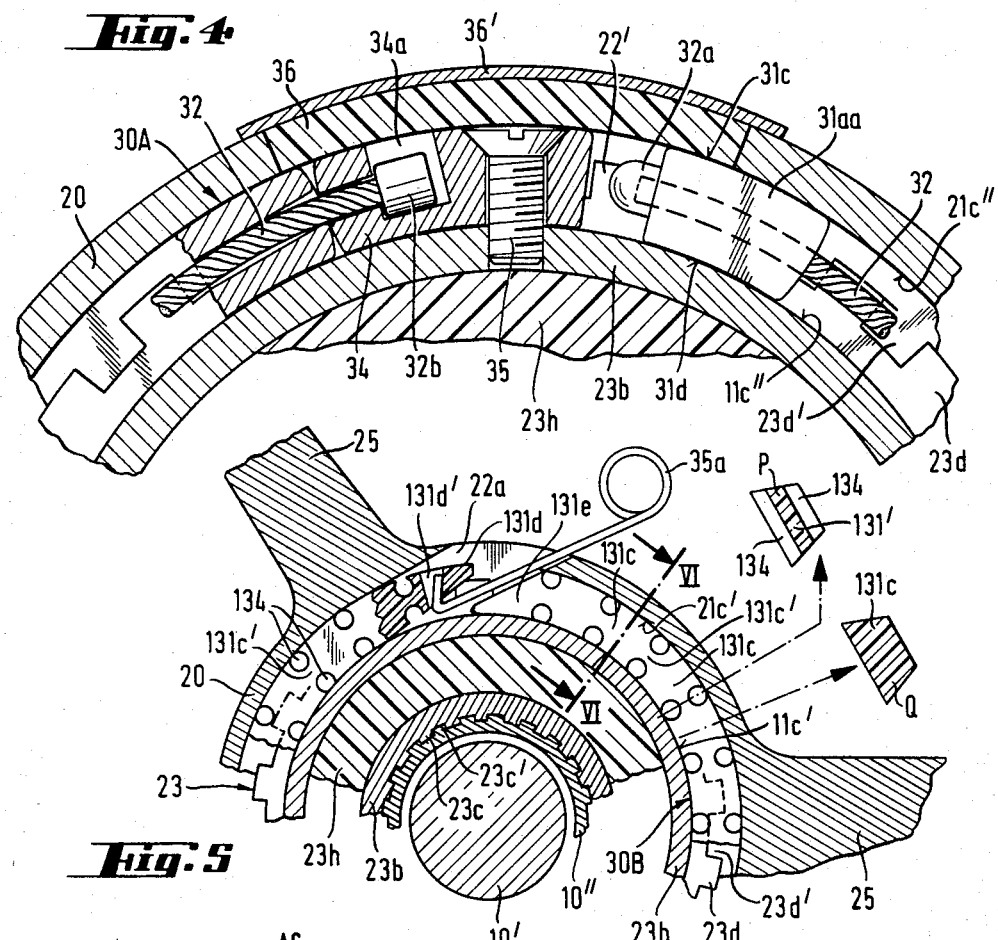
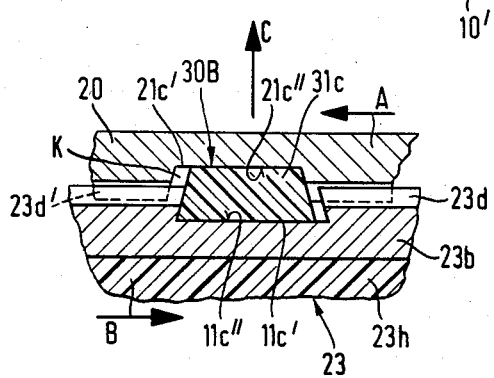
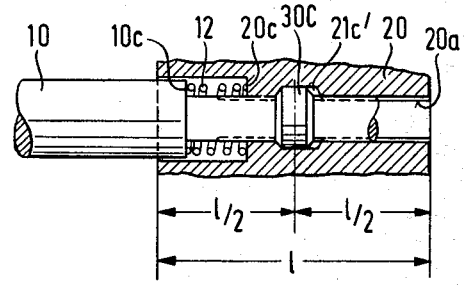

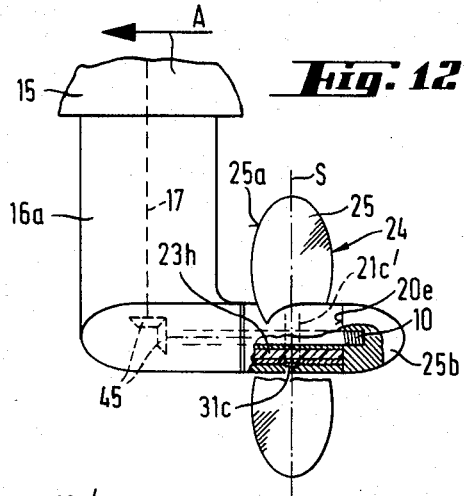
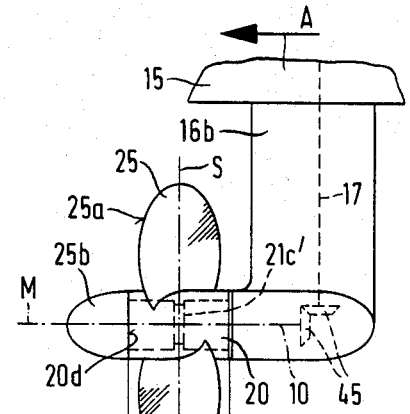
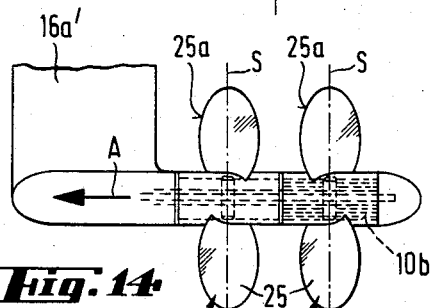
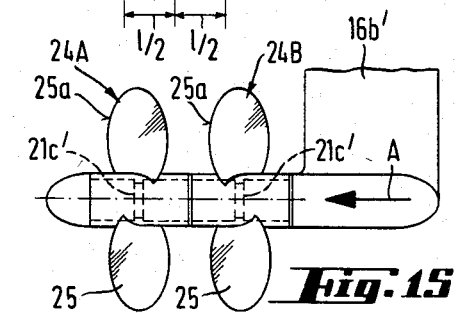
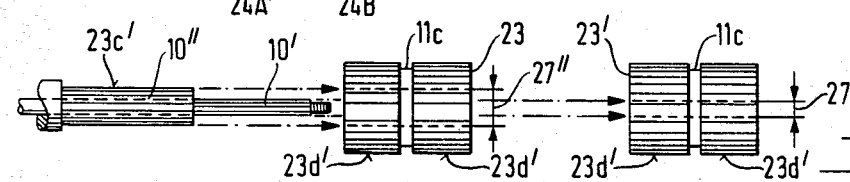
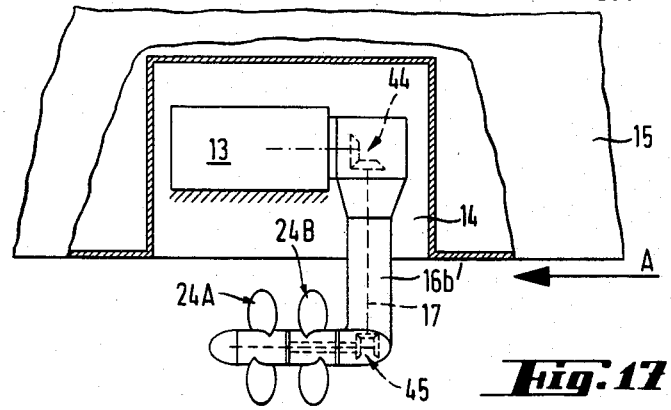

BLOCKING DEVICE FOR PREVENTING AXIAL MOVEMENT IN SELECTED EXTENT

The invention relates to a device for preventing in selected extent, inclusive zero extent, axial movement between a first body prowided with an opening having a cylindrical inner wall, and a second body having a cylindrical surface or outer wall fitting into said opening, circumferential grooves being provided in juxtaposed position in said inner and outer walls resepectively and complementing one the other to a circumferential channel into which through an access port a locking means may be introduced. A blocking device of the kind aforesaid is described e.g. in the published French patent application No. 2,438,193 (78,28175) filed on OCt. 3, 1978 by A. Bedue. According to this patent application, the cover of a high pressure vessel is releasably attached to the body of the vessel with the aid of two said grooves and either a plurality of loose ball elements, or one elongated, densely packed hellical spring introduced into said channel. A similar device is described also in French Pat. No. 73.06259 issued Oct. 15, 1973, to the Company C. A. Norgren.

It is an object of the present invention to further improve the device of the kind specified, in particular with a view to make it better apt to bear the great and generally also greatly varying (in intensity and direction) stresses which occur upon use in marine propulsion systems. In an alternative embodiment, the locking means shall also be uncorroding and have lower average density than water in order to be recoverable if it by accident were slung out of the channel etc.

Another object of the invention is to provide a versatile propeller which is applicable for pusher or traction drive, as well as a novel construction of a secondary exhaust gas discharge, and of a propeller which may be taken off its propeller shaft without leaving the latter one unprotected against the influence of water and atmosphere. These and other advantageous features of the invention will become evident from the study of the enclosed drawings and patent claims.

Figure 2:
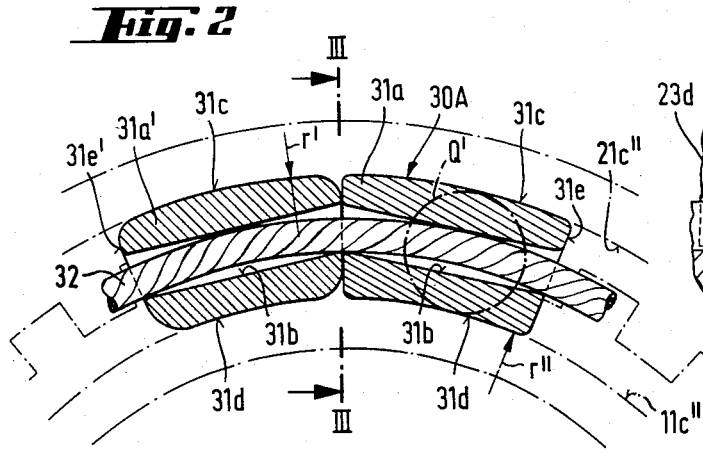
Figure 3:
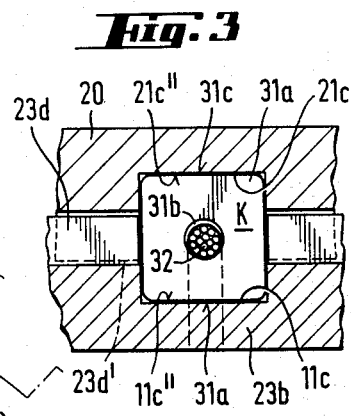
Figure 8:
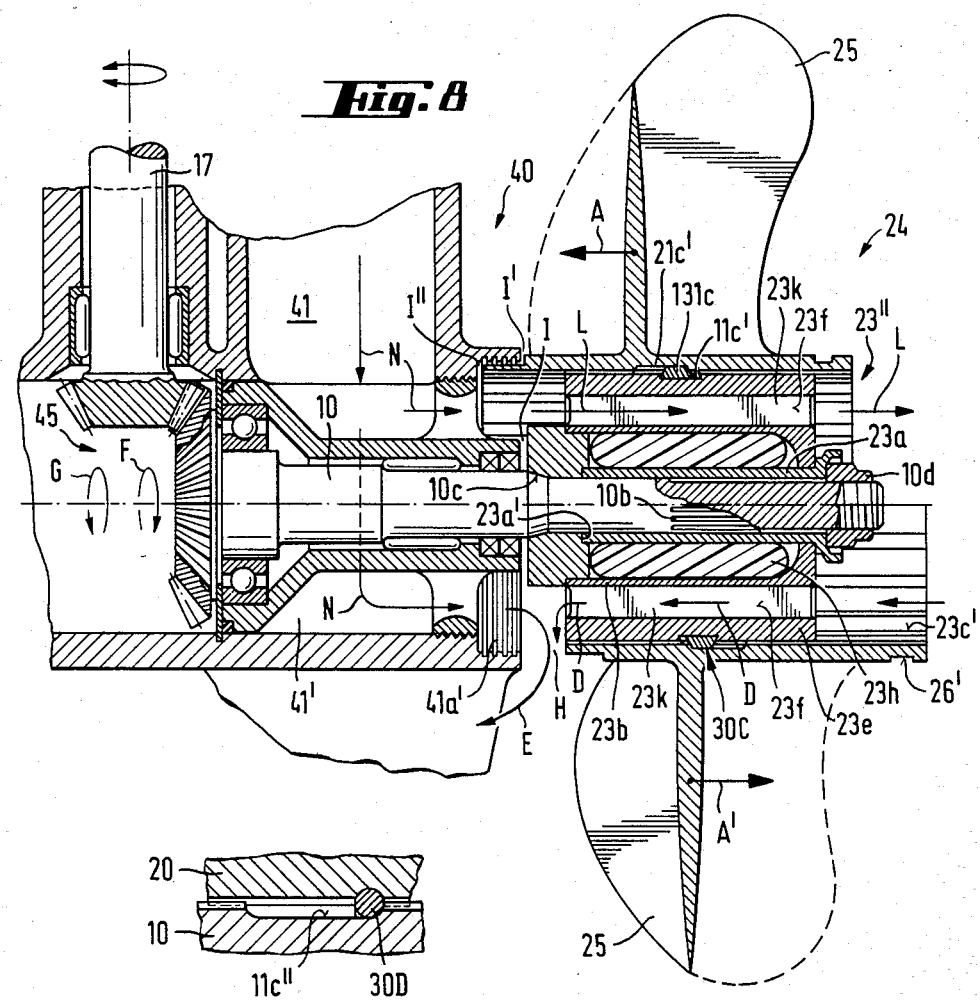
Figure 9:
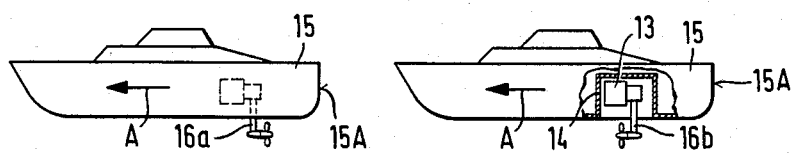
Figures 10, 11:

The invention is characterised by the features evident from the attached patent claims, and it will now be explained more in detail with the aid of the enclosed schematical drawings which refer to exemplary embodiments and in which FIG. 1 is a transversal section through the central portion of a boat propeller for a double propeller drive according to the present invention, FIG. 2 is an axial section at a larger scale through two different link members of FIG. 1, FIG. 3 is a cross-section along plane III—III in FIG. 2, FIG. 4 is a transversal section through a part of an alternative embodiment of the device of FIG. 1, FIG. 5 is a transversal section through another embodiment of the present invention, FIG. 6 is a cross-section at a larger scale along the plane IV—IV of FIG. 5, FIG. 7 is a longitudinal sectional view, at a smaller scale, through the central part of a propeller hub according to the invetention, FIG. 8 is a longitudinal section through still another embodiment of the present invention, FIG. 9 shows in a section along the same plane as FIG. 8 and at a larger scale a modified detail of the embodiment of FIG. 8, FIGS. 10 and 11 show a motor boat which is apt for the application of the present invention, FIGS. 12 and 13 show in side view at a larger scale the lower units of the boat according to FIGS. 10 and 11, FIGS. 14 and 15 show in side view at the same scale as FIGS. 12 and 13 two alternative embodiments of the lower units in the boat according to FIGS. 10 and 11, FIG. 16 is a plan view at a smaller scale of a double propeller shaft and two associated intermediate hub means according to the present invention, and FIG. 17 is a side view at a larger scale of a part of the boat of FIG. 11 when fitted with a lower unit according to FIG. 15.

Parts with identical functions bear in all drawing figures identical or analoguous reference characters.

In FIG. 1 is shown how the forward propeller 24A in a double drive with pusher propellers (see FIG. 14) according to the invention is mounted with its hub portion 20 on a propeller shaft. Propeller blades 25 extend outwardly from hub portion 20. The rearward propeller in a double drive with traction propellers (see propeller 24B in FIG. 15) is mounted in analoguous manner. An inner propeller shaft 10' for the other of the two propellers is disposed within a hollow outer propeller shaft 10" for the said propeller. Shaft 10" in its turn is surrounded by an intermediate hub means 23 which comprises a rubber sleeve 23h arranged between and bonded to a rigid inner tubular cover 23a of metal, and a rigid outer tubular cover 23b, also of metal. Said inner cover 23a is with the aid of splines 23c in non-rotating manner connected to the tubular outer propeller shaft 10", which is provided with corresponding splines 23c' (see also FIG. 16). In an outer wall (surface) of the outer cover 23b is an annular circumferential groove 11c provided (inner groove) and in the inner wall 20a' of the opening 20a in the hub portion 20 of propeller 24A is a co-operating annular circumferential groove 21c provided (outer groove). Adjacent to said grooves 11c, 21c are in the said outer wall splines 21d and in the said inner wall splines 23d provided. When propeller 24A has been mounted on shaft 10", it is brought in a position where grooves 11c and 21c are juxtaposed and constitute together a circumferential inner channel K into which through an accession port 22, provided in the hub 20, a locking means 30A may be introduced. Splines connections 23c, 23c' and 23d, 23d' provide for the transmission of torque from propeller shaft 10" to propeller 24A, and locking means 30A provides for the transmission of pushing or traction force from propeller 24A to shaft 10", wherefrom said force in conventional manner is conveyed further to the whole boat.

Locking means 30A comprises a plurality of rigid link members 31a having each an axial through-opening 31b with the aid of which they are threaded on a flexible cable means 32.

In FIG. 2 are shown at a larger scale and in axial cross-section two link members 31a and 31a', slightly differing in shape. Both members are in cross-section limited by an outer peripheric arc 31c which has the same radius r' of curvature as the bottom 21c" of groove 21c, and an inner peripheric arc 31d which has the same radius r" of curvature as the bottom 11c" of groove 11c. If the cross-sectional shape of said grooves and said link members is a parallelogram, e.g. a rectangle as shown in FIG. 3, then said arcs will define profiles of cylindrical faces. If said cross-sectional shape is circular, as shown in phantom at Q', said peripheric arcs 31c, 31d define two curvatures of a toric surface lying in the same plane.

The front faces 31e, 31e' of each link member may either be planar and radial relative a common center of said two peripheric arcs, possibly with only slightly rounded edges, as shown in link member 31a, and in FIG. 1, or they may be markedly rounded off, as shown in link member 31a'. One locking means 30A may comprise link members of only one sort, or of both.

According to FIG. 1, cable means 32, e.g. multiwire cable, is at one end with the aid of a terminal bead 32a anchored in a terminal member defined by a link member 31aa, and at the other end is anchored in an attachment member 33 in the form of a plug provided with a thread 33a and screwed in a thread 22a in the wall of access port 22.

In FIG. 4 is shown an alternative embodiment of an attachment member 34 which with the aid of a screw 35 is firmly fixed to the outer cylindrical cover 23b. Cable means 32 is provided with another terminal bead 32b and may be introduced into member 34 through an opening 34a. Access port 22' is covered by a rubber insert 36 and an outer rigid sleeve 36'.

In FIGS. 5 and 6 is shown a locking means 30B constituted by a rod of plastics material such as an acetal resin provided with a plurality of juxtaposed indentations 134 where the cross-sectional area P of the rod is markedly reduced relative the normal cross-sectional area Q, whereby between two adjacent indentations 134 essentially rigid link members 131c, interconnected by flexible bridges 131c', are obtained. It will be readily understood that such bridges may be in principle also located at the outer or inner periphery of the locking means 30B, i.e. that the indentations may be provided only at one of said peripheries, and made deeper than what is shown in FIG. 5.

Locking means 30B has end link members 131d, 131e with tapering profile which may partially overlap one the other, and in link member 131d is an opening 131d' provided which defines an engagement means for a hooked-shaped mounting tool 35a. Access port 22a is a longitudinal opening. Advantageously, locking means 30B may be made of a plastics material having lower density than water, so that it will not sink in water. Also locking means 30A may be made of such plastics and have lower average density than water for better retrieval, if lost at sea.

Grooves 11c', 21' (FIG. 6), as well as locking means 30B, may in cross-section have the shape of a trapezoid, e.g. with angles 85° at the bases. Grooves 11c', 21c' may be broader (i.e. have in the direction of the propeller shafts 10', 10" greater dimension) than what is the case with the locking means to allow axial movement in predetermined, limited extent. At assembly, locking means 30B are introduced (and at disassembly, removed) either by hand or, preferably, with the aid of mounting tool 35a. In operation, as soon as the propeller begins to rotate for forward motion of the boat, hub 20 will be by the effect of propelling force A, counteracted by the resistance B of the boat, displaced on shaft 10" into the position shown in FIG. 6. It will be appreciated upon study of FIG. 6 that thereby locking means 30B are safely held in channel K, and cannot be slung out by centrifugal force C, even if access port 22a remains uncovered. At backward motion, the same process takes place in reverse direction. At rest, when no centrifugal force is active, the propeller may shift on its shaft to the extent allowed by the difference in the breadth dimension between the grooves and the locking means. This limited axial mobility of the propeller, not interfering with the torque transmission effected by splines connections allowing axial shift, is very useful, as it helps to prevent corrosion and overgrowing, favoured by stationary relationship. It may be therefore preferred to provide in accordance with FIG. 7 an expansion spring means 12 between a shoulder 10c on a propeller shaft 10 and a shoulder 20c in the opening 20a in hub 20, which spring means pushes the propeller back on shaft 10 as soon as the driving force ceases to work. The splines connection, which for clarity is not shown in FIG. 7, may extend e.g. along the whole right hand half of opening 20a. From FIG. 7 will be further recognised that the outer circumferential groove 21c' may be located in the middle of the total length l of the hub 20, or more precisely of the opening 20a in said hub, whereby the advantage is obtained that the same propeller may be mounted as well for pushing as for traction, as will be discussed more in detail in connection with FIGS. 12 to 15.

It will be understood that the grooves and the locking means may also have other than trapezoid-shaped cross-sections, to achieve said securing effect, provided that the cross-sectional shape tapers from the bottom of the inner circumferential groove towards the bottom of the outer circumferential groove, and it is of course evident that such a tapering shape also may be used with the locking means 30A of FIG. 1. On the other hand, locking means 30B may also have any other suitable cross-sectional shape, e.g. a circular or rectangular one. It will be further recognised that, for obtaining said limited axial shift, only one of said grooves needs to be broader than the locking means.

It is known to discharge exhaust gases in marine outboard propulsion systems through a hollow propeller shaft and a hollow propeller hub, and to mount said shaft in limited extend axially movable so that at backward motion the shaft is by the propeller somewhat pulled out and at the same time discharge through the propeller hub is discontinued. The reason for this is that an exhaust gas jet directed against the direction of motion would impair the driving quality of the boat. In FIG. 8 is shown an embodiment of the present invention in which said problem is solved in a novel manner. In the upper half of the drawing is shown the state at forward motion, and in the lower half at backward motion.

In the lowest part of a lower unit 40 of an outboard driving system, a propeller shaft 10, driven in rotation by a driving shaft 17 and a bevel gear 45, is stationarily mounted. Shaft 10 and a propeller 24, mounted thereon, may be driven either in the direction of arrow F for forward motion, or in the direction of arrow G for backward motion. Reversing means to this purpose are well known in the art and lie outside the scope of the present invention.

Propeller 24 is provided with an intermediate hub means 23" comprising the rigid inner cover 23a, the rubber sleeve 23h and the rigid outer cover 23b, as already shown in and described in connection with FIG. 1. The outer rigid cover 23b is now however at a certain spacement, defining an annular channel 23k, surrounded by a third rigid cover 23e. Radial ribs 23f connect covers 23b and 23e one with the other.

The exhaust gases are lead from motor 13 (FIG. 17) through a vertical duct 41 in the lower unit 40 in the direction of arrows N. Vertical duct 41 changes at its lower part into an annular duct 41' which communicates with said channel 23k in the propeller hub. Upon forward motion of the boat, the exhaust gases continue through said channel 23k in the direction of arrows L to be discharged into the water. Where the duct 41' and channel 23k meet, a labyrinth seal 41a' is provided into the slots of which at operation water, always present in exhaust gases, is slung by centrifugal force, whereby in forward motion the exhaust flue is securely sealed at this place.

The inner circumferential groove 11c' is provided in the outer wall of said third rigid cover 23e and may be somewhat broader than what the link members 131c of locking means 30C are, so that the locking means may be introduced therein in spite of its possibly trapezoid-shaped profile. The outer circumferential groove 21c' in the wall of the hub opening is markedly broader than the locking means, e.g. twice so much.

At forward motion, propeller 24 pushes in the direction of arrow A and has the position shown in the upper half of the drawing. Duct 41' and channel 23k communicate one with the other, and the axial push of the propeller is transmitted via locking means 30C to the third cover 23e, via the radial ribs 23f to the outer cover 23b, via a shoulder 23a' at the inner cover 23a to this inner cover, and finally via a sloping shoulder 10c on the shaft 10 to this shaft. Thanks to small gaps I, I', I" left free, no friction occurs at the place of these gaps between parts which rotate one relative the other.

The torque is transmitted from shaft 10 to the propeller 24 via splines 10b between the shaft 10 and the inner cover 23a, via the intermediate hub means 23", the radial ribs 23f, and via splines 23c' between the third cover 23e and the hub proper of the propeller.

At backward movement, propeller 24 pulls in the direction of arrow A' and is consequently axially shifted, to an extent allowed by the breadth of grooves 11c' and 21c', into a rearward position shown in the lower half of the drawing. The function of shoulder 10c is taken over by a nut 10d which is screwed on a threaded terminal portion of shaft 10. Through said axial shift an annular exhaust opening H is obtained at the forward edge of the propeller hub. Water penetrates, or more precisely, is pushed into channel 23k and does not allow the exhaust gases to proceed through this channel, so that they are deflected in the direction of arrow E and discharged through opening H. Also water which has been pushed into channel 23k in the direction of arrows D is discharged through opening H and enhances the discharge of the exhaust gases therethrough.

From the study of FIG. 8 will be apparent that, thanks to the arrangement in accordance with the present invention, shaft 10 is by surrounding parts effectively—insulated from water and its detrimental effects. An open groove 26' with a rectangular cross-section is provided at the rearward outside portion of the propeller hub as a protection against the exhaust gases being through negative pressure pushed into the region of the propeller, e.g. upon driving along a curved track.

It will be appreciated that in order to achieve limited axial mobility, also the inner groove may be made broader than the other one, or that both grooves may be in equal extent broader than the locking means, as shown e.g. in FIG. 6. It will be also recognised that from the point of view of limited axial mobility, the grooves and the locking means may have arbitrary cross-sectional shape, as shown e.g. in FIG. 9 with a locking means 30D having circular cross-section, i.e. toroid-shaped link members.

In FIGS. 10 and 11 is shown a motor boat 15 driving in the direction of arrow A and propelled by an inboard-outboard drive of the so-called sailing boat type ("S-drive") where the lower units 16a, 16b protrude from the bottom of the boat forwardly of the transom 15A. The detailed arrangement of the driving system of FIG. 11 will be shown at a larger scale in FIG. 17. In FIG. 10 is shown a pushing propeller system and in FIG. 11 a traction propeller system. Thanks to the present invention, the same propeller may be used in both instances, whereby as well production costs as storage costs are reduced. Conventionally, it was not possible to use the same propeller in both positions, because the upstream edges 25a (FIGS. 12, 13) of the propeller blades 25 always must lie upstreams, so that the propeller cannot be turned round. In FIGS. 12 and 13 are the lower units 16a and 16b, comprising the drive shaft 17, the bevel gear 45 and the propeller shaft 10, shown at a greater scale.

All propellers in FIGS. 12 to 15 are provided with hubs 20 having the outer circumferential groove 21c' located in the middle 1/2 of the length of the hub, similarily as shown in FIG. 7. The hubs, or at least their central openings, are symmetric relative a hypothetical plane S which at said half length 1/2 extends at right angles to the rotational axis M (FIG. 13) of the propeller, so that the propeller may be mounted either rearwardly of a lower unit 16a according to FIG. 12, or in front of a lower unit 16b according to FIG. 13.

A streamlined terminal cap 25b is provided for attachment to the front face 20d or 20e of the propeller hub, whichever of these faces may be left free. Cap 25b may be affixed to the hub 20 or, analogically as nut 10d in FIG. 8, to the propeller shaft 10.

In FIGS. 14 and 15 are shown driving systems having lower units 16a', 16b' with double propellers 24A, 24B of which one may be of the same type as shown more in detail in FIG. 1. Lower units 16a', 16b' may be mounted on boat 15 instead of the units 16a, 16b. In double propeller driving systems occurs the additional difficulty that both propellers must not be identical what concerns the shape of the blades.

Therefore, when the same pair of propellers which has been used for pushing, shall be used for traction, the upstream propeller 24A must remain upstream and the downstream propeller 24B must remain downstream, which means that each propeller lies in one instance nearest to the lower unit, and in the other instance remotest therefrom. Even according to the present invention, two different types of propellers, having differently shaped blades, must be used. But then no difference needs to be made upon mounting such a propeller on an inner shaft such as shaft 10' in FIG. 1, when using it as propeller 24B in FIG. 14, or on an outer shaft such as shaft 10" in FIG. 1, when using it as propeller 24B in FIG. 15. According to FIG. 16, an intermediate hub means 23 (as shown in detail in FIG. 1), having a central opening 27" fitting the outer shaft 10", and a similar intermediate hub means 23', having a smaller diameter central opening 27' fitting the inner shaft 10' is provided. Said openings in both said means are provided with splines and so are also both said shafts. Depending on the shaft on which the propeller has to be mounted, the respective intermediate hub means 23 or 23' is used.

It will be appreciated in this context that in the embodiments according to FIGS. 12 to 16 also the essentially horizontal propeller shafts such as 10', 10" in FIG. 16 are identical whether they protrude from the bevel gear 45 backwardly for pushing drive, or frontwardly for traction drive.

In FIG. 17 is shown a preferred manner of mounting a traction propulsion system having a lower unit 16b' similar to that shown in FIG. 11. It has already been known to mount an inboard-outboard propulsion system of the sailing boat type, comprising further a motor unit 13, an upper bevel gear 44 and at least one pushing propeller, in a watertight box 14 without a bottom in the boat 15. Such arrangement facilitates mounting and dismounting for possible repair etc. By using a traction propeller arrangement 16b' according to the present invention, which may be easily prepared with the aid to the same propellers as provided for pushing propulsion, a considerable shortening of box 14 in the direction of arrow A may be obtained, without impairing the possiblity to lower down the whole assembly through box 14, because the traction propellers 24A, 24B do not occupy, in contradistinction to a pushing drive arrangement (compare FIGS. 10 and 11) any additional length space.

In all embodiments which comprise an intermediate hub means such as 23, 23', 23", said means may either remain on the propeller shaft when the propeller is taken off, e.g. for repair, or they may follow with the propeller. When they remain on the shaft, they protect it from the adverse effect of exposure to water and atmosphere.

A locking means according to the present invention may also be used without connection with splines or any other means preventing rotation, and be used as a rotational bearing, e.g. by the link members 31a of FIG. 1 being made of bearing metal (antifriction metal) and channel K being filled with a lubricant, or by the link members 31a of FIG. 1 or 131c of FIG. 5 being made of so-called self-lubricating plastics material.

I claim:

1. In a blocking device for limited axial movement between a first body (20) having a cylindrical inner wall defining an opening, and a second body (23) having a cylindrical outer wall fitting into said opening, said inner and outer walls having a respective outer and inner circumferential groove (11c, 21c), and in juxtaposed position complementing each other to form a circumferential channel (K), said first body having an access port (22), a locking means (30A) introducible through said access port and including a plurality of massive and substantially rigid, separated link members (31a, 131c), said link members having in a radial direction substantially the same dimension as said channel and being circumferentially limited by an outer arc (31c) having the same radius (r') as the bottom of said outer groove, and an inner arc (31d) having the same radius (r") as the bottom of said inner groove, said device is used for blocking a propeller shaft (10) in the hub of a boat propeller (24), said outer circumferential groove being located in the middle of the axial length of said hub to enable mounting of the propeller in two reversed positions.

2. In the device according to claim 1 wherein each said link member includes an axial through-opening (31b), an elongated flexible cable means (32) passing through said openings in all said link members and at each end is anchored in a terminal member, and screw-and-thread connection means (22a, 33a; 35) engaging one of said terminal members for connection thereof to one of said bodies.

3. In the device according to claim 1, wherein the link members in cross-section have the shape of a parallelogram limited by four straight lines.

4. In the device according to claim 1, wherein at least one of said circumferential grooves (11c', 21c') is in the axial direction (A) of said bodies broader than the link members so that axial blocking of said bodies occurs with a predetermined free motion margin.

5. In the device according to claim 1, wherein the locking means is adapted to operate as a sliding bearing and is made essentially of one of the materials: bearing metal and selflubricating plastic.

6. In the device according to claim 1 further including means for blocking rotational movement between said two bodies.

7. In a propeller device comprising a boat propeller (24, 24A, 24B) having propeller blades (25) and a hub portion (20) including an inner wall defining an opening for accommodating a propeller shaft (10, 10", 10'") said inner wall having an outer circumferential groove, a partly flexible locking means (30A, 30B) partially located in said outer groove, said shaft having an inner circumferential groove in its surface for partially receiving said locking means therein, said hub portion having an access port (22) enabling introduction of said locking means into an inner channel (K) defined by said inner and outer grooves in juxtaposed position, said locking means including an elongated flexible unitary plastic rod having a selected cross-section, said rod including a plurality of spaced indentations for increasing the flexibility thereof; said indentations forming reduced cross-sections of said rod and defining flexible bridges, said rod between each two adjacent indentations forming rod sections constituting rigid link members, said rod including terminal rigid link members forward of the first said indentation and rearward of the last indentation, and a means for blocking rotational movement between said hub portion and shaft.

8. In a device according to claim 7, wherein said terminal link members include end portions having a configuratively tapering profile for partially overlapping each other.

9. In a device according to claim 7, wherein said rod is of acetal resin material.

10. In the propeller device according to claim 7 wherein said latter means includes at least one spline connection between said hub portion and shaft.

11. In a propeller device according to claim 9, wherein said indentations include two juxtaposed portions on either side of said bridges, each indentation extending from one periphery of said rod.

12. In a propeller device according to claim 7, wherein said rod and said channel having a cross-sectional shape tapering from the bottom of said inner circumferential groove towards the bottom of said outer circumferential groove and being of a trapezoid-shape cross-section with the base thereof at the bottom of said inner groove, so that said rod is maintained in said channel even though affected by centrifugal force during propeller operation.

13. In a propeller device according to claim 7 wherein said outer circumferential groove is located midway (1/2) of said hub opening which is symmetric relative to a plane (S) extending at right angles to a length axis (M) of the propeller, so that said propeller may be selectively mounted for push or traction propulson with the forward edges (25a) of said propeller located upstream in both instances.

14. In a propeller device according to claim 7, wherein at least one of said circumferential grooves is in the axial direction of said hub portion broader than said rod so that axial blocking between said hub portion and said shaft occurs with a predetermined free motion margin sufficiently dimensioned to inhibit corrosion and overgrooving normally occurring with stationary relationship between propeller and shaft.

15. In a propeller device according to claim 14, further including spring means (12) mounted between said hub portion and the shaft for pushing said propeller in a predetermined position on said shaft upon cessation of the driving force thereon.

16. In a propeller device according to claim 7, wherein said hub portion includes exhaust gas discharge therethrough, said free motion margin is dimensioned to open an auxiliary discharge port at the forward edge of said hub portion when said propeller is in position for rearward drive.

17. In a propeller device according to claim 7 further comprising an intermediate hub means (23, 23'') having an outer cover and an inner cover, said outer and inner cover having a central opening, said outer cover includes said outer circumferential groove, a first spline means within said outer cover, a second spline means in said central opening of said inner cover, and two readily interchangeable intermediate hub means having identical outer cover dimensions and different diameters of said central openings in order to fittingly accommodate one shaft of the coupling comprising the outer and the inner propeller shaft of a double propeller propulsion system.

18. In a propeller device according to claim 7 wherein said rod has lower average density than water.

19. In a blocking device for limited axial movement between a first body (20) having a cylindrical inner wall defining an opening, and a second body (23) having a cylindrical outer wall fitting into said opening, said inner and outer walls having a respective outer and inner circumferential groove (11c, 21c), and in juxtaposed position complementing each other to form a circumferential channel (k), said first body having an access port (22), a locking means (30A) introducible through said access port and including a plurality of massive and substantially rigid, separated link members (31a, 131c), said link members having in a radial direction substantially the same dimension as said channel and being circumferentially limited by an outer arc (31c) having the same radius (r') as the bottom of said outer groove, and an inner arc (31d) having the same radius (r'') as the bottom of said inner groove, at least one of said circumferential grooves (11c', 21c') is in the axial direction (A) of said bodies broader than the link members so that axial blocking of said bodies occurs with a predetermined free motion margin, said device is used for blocking a propeller shaft (10) in the hub of a boat propeller with gas discharge through said hub, said free motion margin is dimensioned to free an auxiliary discharge port at the forward edge of said hub when said propeller is in position for rearward drive.

20. In a blocking device for limited axial movement between a first body (20) having a cylindrical inner wall defining an opening, and a second body (23) having a cylindrical outer wall fitting into said opening, said inner and outer walls having a respective outer and inner circumferential groove (11c, 21c), and in juxtaposed position complementing each other to form a circumferential channel (K), said first body having an access portion (22), a locking means (30A) introducible through said access port and including a plurality of massive and substantially rigid, separated link members (31a, 131c), said link members having in a radial direction substantially the same dimension as said channel and being circumferentially limited by an outer arc (31c) having the same radius (r') as the bottom of said outer groove, and an inner arc (31d) having the same radius (r'') as the bottom of said inner groove, said device is used for blocking a propeller shaft in the hub of a boat propeller provided with an intermediate hub means having an outer and an inner cover, said inner circumferential groove being provided in said outer cover and spline connections are provided in said inner cover and on thereto adjacent parts, so that when the propeller is being removed, the intermediate hub means may be selectively retained on the propeller shaft or in the hub of the propeller.

21. In a blocking device for limited axial movement between a first body (20) having a cylindrical inner wall defining an opening, and a second body (23) having a cylindrical outer wall fitting into said opening, said inner and outer walls having a respective outer and inner circumferential groove (11c, 21c), and in juxtaposed position complementing each other to form a circumferential channel (K), said first body having an access port (22), a locking means (30A) introducible through said access port and including a plurality of massive and substantially rigid, separated link members (31a, 131c), said link members having in a radial direction substantially the same dimension as said channel and being circumferentially limited by an outer arc (31c) having the same radius (r') as the bottom of said outer groove, and an inner arc (31d) having the same radius (r'') as the bottom of said inner groove, said device is used for blocking a propeller shaft (10) in the hub of a boat propeller, said locking means having a lower average density than water.

* * * * *